July 1, 1969  K. R. BEHRENDSEN  3,452,986
BALL OF MASTICATED, VULCANIZED CIS-1,4
POLYISOPRENE AND MANUFACTURE THEREOF
Filed May 13, 1966
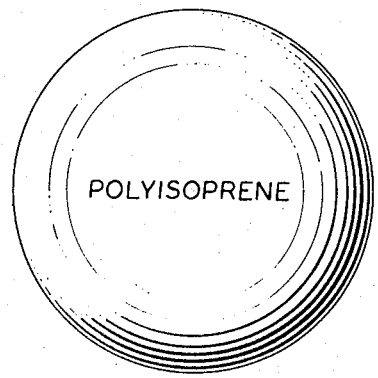
INVENTOR.
KENNETH R. BEHRENDSEN
BY
ATTORNEY

United States Patent Office 3,452,986
Patented July 1, 1969

3,452,986
BALL OF MASTICATED, VULCANIZED CIS-1,4 POLYISOPRENE AND MANUFACTURE THEREOF
Kenneth R. Behrendsen, Ashland, Ohio, assignor to Eagle Rubber Co., Inc., Ashland, Ohio, a corporation of Delaware
Filed May 13, 1966, Ser. No. 550,017
Int. Cl. A63b 37/00
U.S. Cl. 273—58                                6 Claims

ABSTRACT OF THE DISCLOSURE

A solid rubber ball is made of vulcanized polyisoprene with a cis-1,4 content of at least 85 percent. It may include a small amount of dioctyl adipate or other extender. It will contain 3 to 6 parts of sulfur. It has a high rebound.

---

This invention relates to a solid rubber ball of greater resilience than a ball composed of natural rubber. It is designed primarily for use as a toy to be used by children of all ages.

It is known that the various rubbers have a different degree of resilience when vulcanized, and it has been found that vulcanized polyisoprene which has a high content of cis-1,4-polymer has greater resilience when vulcanized than a ball of vulcanized natural rubber. By "high cis-1,4-content" is meant a cis-1,4-content of 85 percent, or preferably 95 percent or greater. The ball is solid and composed throughout of this particular rubber unless it be coated with an elastomeric coating of different composition.

The uncured polymer is compounded with a suitable vulcanizing agent and accelerator together with such compounding ingredients as antioxidant and pigment if desired. Usually the ball is not coated although a coating of the same rubber or a different elastomer may be used.

The accompanying drawing illustrates the ball of this invention.

Various compounding compositions may be employed. A satisfactory composition is prepared as follows, using premasticated polyisoprene with a cis-1,4-content of about 96 percent:

| Polyisoprene: | Parts |
|---|---|
| Natsyn 200 [1] | 100 |
| Zinc oxide | 10 |
| Stearic acid | 2 |
| Antioxidant: | |
| 2,2' - methylenebis(4 - methyl-6-tertiary-butyl phenol) | 1 |
| Accelerators: | |
| N-oxydiethylenebenzothiazole-2-sulfenamide | 2 |
| Tetramethylthiuramdisulfide | 0.75 |
| Sulfur | 5 |
| Dioctyl adipate | 5 |
| Retarder W [2] | 0.5 |

[1] Produced by The Goodyear Tire & Rubber Co.
[2] Salicylic acid.

It is desirable that the rubber, before compounding, be masticated to some extent, to facilitate the molding operation, although excessive mastication may reduce its resilience. If Natsyn 200 (a high cis-1,4-polyisoprene) is employed it should be pre-masticated to a Williams Plastometer reading of about 90 before adding the compounding ingredients, in order to facilitate molding and yet produce a ball of high resilience. The amount to which different polymers are masticated prior to the compounding operation will depend upon their viscosity, usually measured by a Mooney viscometer. As is usual during the mastication, the temperature will be increased sufficiently to break the nerve and/or lower the viscosity of the polymer.

The compound of the foregoing formulation, in order to produce the desired high resilience and to facilitate molding, is masticated, as indicated, prior to compounding, and then after compounding is vulcanized for, for example, 20 minutes at 320° F. to give a play ball with greater resilience than the natural rubber ball. The ball is preferably molded by transfer molding, although other methods may be utilized. Such a ball will have a rebound of at least 85 percent when dropped from a height of 72 inches on to a hard surface.

The proportions of compounding ingredients may be varied and coloring ingredients, etc. may be included. If Natsyn 400 (also a high cis-1,4-polyisoprene of The Goodyear Tire & Rubber Company) is used, less mastication and greater acceleration will be required. The sulfur content may vary between 3 and 6 parts. Depending upon the vulcanizer, curing agent and time and temperature of curing, the antioxidant employed, and the amount of each used may be varied as is well known in the art. Five parts of FEF (fast extrusion furnace) black gives a very acceptable color to the ball. Other coloring agents may be employed. More or less plasticizer is utilized and other oil or ester plasticizers may be employed instead of dioctyl adipate. The ball may be covered with rubber or other elastomeric coating material which may be of a different composition as desired. A mottled ball may, for example, be made by transfer molding from plied-up layers of the polyisoprene which have been pigmented with different colors.

The ball may be molded by preparing a biscuit for each of the cavities, but is preferably formed by placing a slab of the compounded rubber, which may be composed of plies of different colors, above the mold with the cavities in it, and then by pressure of the curing press forcing the rubber into the cavities. This is a most satisfactory method of molding and is less expensive than other methods. An attractive ball is made by molding a ball from a slab composed of plies of rubber compounded with different coloring ingredients although otherwise composed of substantially the same rubber.

The balls will be molded to diameters of perhaps one to four inches, a preferred ball being about two inches in diameter.

The invention is covered in the claims which follow.

I claim:
1. A resilient solid ball composed of vulcanizate of masticated polyisoprene with a cis-1,4-content of at least 85 percent which before vulcanization had a Williams Plastometer reading of about 90, and which contained substantially 5 parts of extender and 3 to 6 parts of sulfur per 100 parts of the rubber, the ball having a rebound of at least 85 percent when dropped from a height of 72 inches on to a hard surface.

2. The ball of claim 1 in which the rubber has a cis-1,4-content of at least 95 percent.

3. The method of producing a resilient solid ball which comprises transfer molding a ball from a slab composed throughout of a vulcanizable polyisoprene of at least 85 percent cis-1,4 content which before vulcanization had been masticated to a Williams plasticity of about 90, and contained substantially 5 parts of extender and 3 to 6 parts of sulfur per 100 parts of the rubber, and then heating the ball to vulcanize the rubber composition.

4. The method of claim 3 in which the cis-1,4-content of the polyisoprene is at least 95 percent.

5. The method of producing a resilient solid ball which comprises plying up plies of vulcanizable rubber composition, the rubber of said plies being composed essentially of polyisoprene of at least 85 percent cis-1,4-content masticated to a Williams plasticity of about 90, and producing the ball by transfer molding of the same into a ball cavity of a mold, and then heating the ball to vulcanize the rubber.

6. The process of claim 5 in which the plies comprise plies of different colors.

References Cited

UNITED STATES PATENTS 3,119,622   1/1964   Weigert.
3,159,691   12/1964   Kraus _____ 260—41.5
3,241,834   3/1966   Stingley.

ALLAN LIEBERMAN, *Primary Examiner.*

U.S. Cl. X.R.

260—318, 415; 264—328